United States Patent [19]

Juang

[11] Patent Number: 5,409,329
[45] Date of Patent: Apr. 25, 1995

[54] DRILL GUIDING DEVICE

[76] Inventor: Bor-Chang Juang, No. 3, Lane 14, Chen-Hsing Rd., Tai-Ping Hsiang, Taichung Hsien, Taiwan, Prov. of China

[21] Appl. No.: 219,040
[22] Filed: Mar. 29, 1994
[51] Int. Cl.6 .............................................. B23B 47/28
[52] U.S. Cl. ................................. 408/115 R; 408/103
[58] Field of Search ................... 408/97, 103, 115 R, 408/115 B

[56] References Cited

U.S. PATENT DOCUMENTS

| 706,392 | 8/1902 | Corliss | 408/103 |
|---|---|---|---|
| 2,602,238 | 7/1952 | Wellman | 408/115 R |
| 4,158,523 | 6/1979 | Schotzko | 408/115 R |

FOREIGN PATENT DOCUMENTS

| 3039673 | 5/1982 | Germany | 408/115 R |
|---|---|---|---|
| 2071537 | 9/1981 | United Kingdom | 408/115 R |

*Primary Examiner*—Daniel W. Howell
*Attorney, Agent, or Firm*—Knobbe, Martens, Olson & Bear

[57] ABSTRACT

A drill guiding device is used to guide axial movement of a drill when forming a hole in a workpiece and includes a clamping assembly and a guide block. The clamping assembly includes a stationary clamping block, a pair of guide shafts which extend horizontally from the stationary clamping block and which have first end portions mounted removably on the stationary clamping block, a threaded shaft parallel to the guide shafts and provided with a head portion which is mounted rotatably to the stationary clamping block and a threaded shank portion which extends axially from the head portion, a movable clamping block mounted slidably on second end portions of the guide shafts and provided with a threaded hole to engage threadedly the threaded shank portion of the threaded shaft, and a mounting block mounted slidably on the guide shafts and disposed between and parallel to the stationary and movable clamping blocks. The guide block is mounted threadedly and adjustably on a selected one of the upright edge, the inclined edge, and the bottom edge of the mounting block and is formed with guide holes that permit extension of the drill thereinto.

6 Claims, 11 Drawing Sheets

DRILL GUIDING DEVICE

BACKGROUND OF THE INVENTION

1. Field of the Invention

The invention relates to a guiding device, more particularly to a drill guiding device used to guide the formation of holes in a wooden workpiece.

2. Description of the Related Art

Referring to FIG. 1, a conventional rectangular wooden frame 1 is shown to comprise four elongated frame members 2. Each of the frame members 2 has opposite mounting surfaces 3 formed with a respective mounting hole 4. In this example, the mounting surfaces 3 incline by an angle of 45°. A wooden peg 5 has two ends which extend into aligned mounting holes 4 of two adjacent frame members 2, and adhesive is applied on the mounting surfaces 3 of the adjacent frame members 2 so as to connect the same.

Referring to FIG. 2, another conventional rectangular wooden frame (1a) is shown to similarly comprise four elongated frame members (2a). Two of the frame members (2a) have opposite side surfaces (3a) which are respectively formed with a pair of mounting holes (4a). The remaining two frame members (2a) have two end surfaces (3b) formed with a respective mounting hole (4b). A wooden peg 5 has two ends which extend into aligned mounting holes (4a, 4b) of two adjacent frame members (2a), and adhesive is applied on the side surface (3a) and the end surface (3b) of the adjacent frame members (2a) so as to connect the same.

During the mass production of the rectangular frames, a drill guiding device is required to guide the formation of mounting holes in the frame members, especially when the mounting surfaces of the frame members are inclined. A conventional clamping device is used with the drill guiding device to ensure that the drill can be maintained perpendicular with respect to the mounting surface. For an individual who wishes to make a small number of rectangular frames in his own workshop, it is not economical to purchase the conventional drill guiding device or clamping device used in factories. However, if no drill guiding device is employed when forming the mounting holes, a high degree of precision cannot be achieved, thereby resulting in the production of poor quality products.

SUMMARY OF THE INVENTION

Therefore, the objective of the present invention is to provide a drill guiding device which is simple in construction, which is relatively inexpensive, which is convenient and easy to operate, and which permits precise formation of holes in a wooden workpiece regardless of the inclination of the working surface.

Accordingly, the drill guiding device of the present invention is used to guide axial movement of a drill when forming a hole in a workpiece and mainly comprises a clamping assembly and a guide block. The clamping assembly includes a stationary clamping block, an elongated guide means, a threaded shaft, a movable clamping block and a mounting block. The guide means extends horizontally from the stationary clamping block and has a first end portion mounted removably on the stationary clamping block and a second end portion. The threaded shaft has a head portion which is mounted rotatably to the stationary clamping block, and a threaded shank portion which extends axially from the head portion. The threaded shaft is parallel to the guide means. The movable clamping block is mounted slidably on the second end portion of the guide means and is provided with a threaded hole to engage threadedly the threaded shank portion of the threaded shaft. The mounting block is mounted slidably on the guide means and is disposed between and is parallel to the stationary and movable clamping blocks. The mounting block has an upright edge, an inclined edge opposite to the upright edge, and a bottom edge extending between the upright and inclined edges. The upright edge is substantially perpendicular to the bottom edge, while the inclined edge forms an angle of about 45° with respect to the bottom edge. Each of the upright edge, the inclined edge, and the bottom edge is formed with a respective screw hole.

The guide block has an intermediate portion formed with a longitudinally extending slot of predetermined length and at least one guide hole on each side of the slot. Each of the guide holes permits the extension of the drill thereinto. A screw fastener extends through the slot of the guide block and engages threadedly the screw hole in a selected one of the upright edge, the inclined edge, and the bottom edge of the mounting block.

In use, the mounting block and one of the stationary and movable clamping blocks clamp opposite sides of the workpiece, and the guide block is positioned adjacent to a working surface of the workpiece such that one of the guide holes of the guide block is aligned with an intended location of the hole to be formed in the workpiece.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
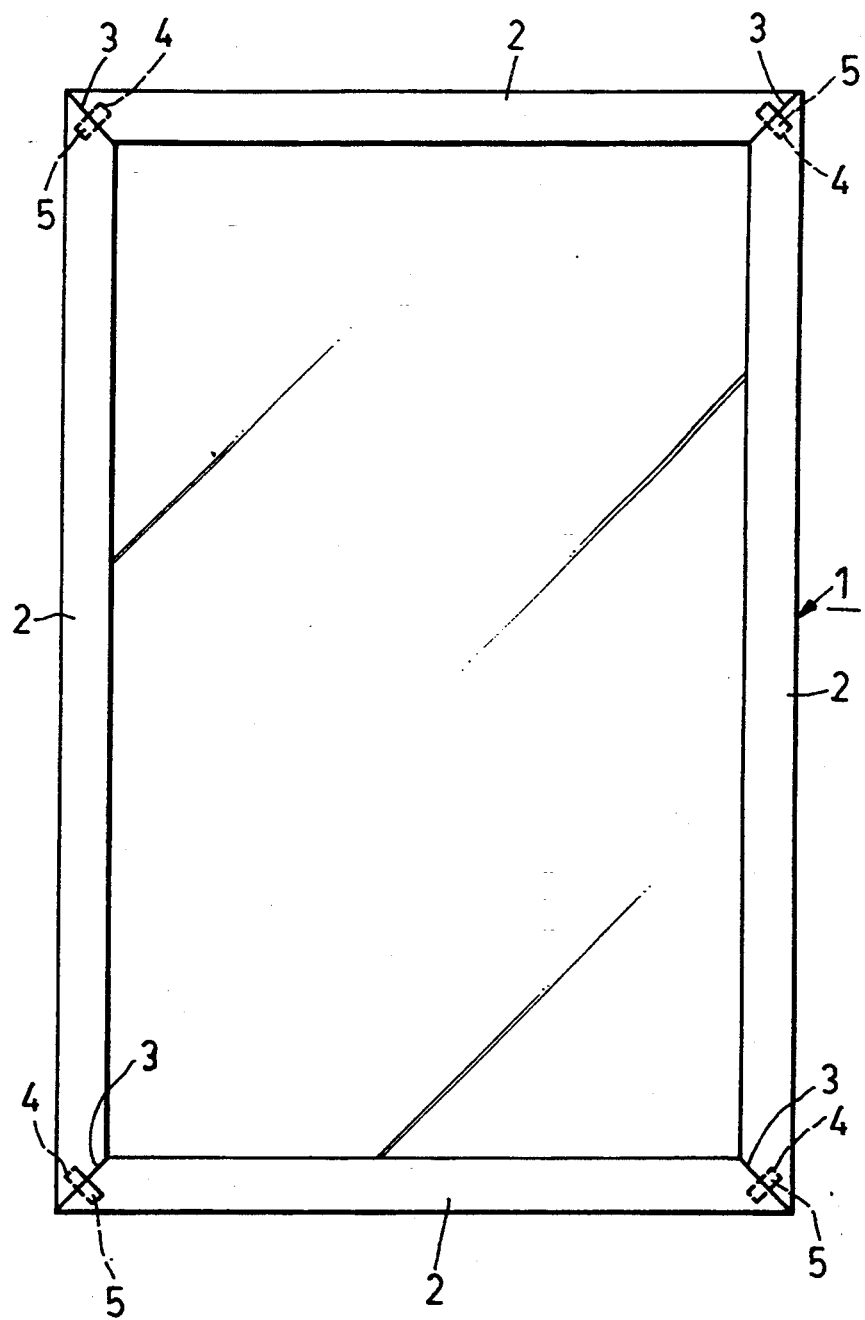
FIG. 1 is a schematic view of a first example of a conventional rectangular wooden frame.
Figure 2:
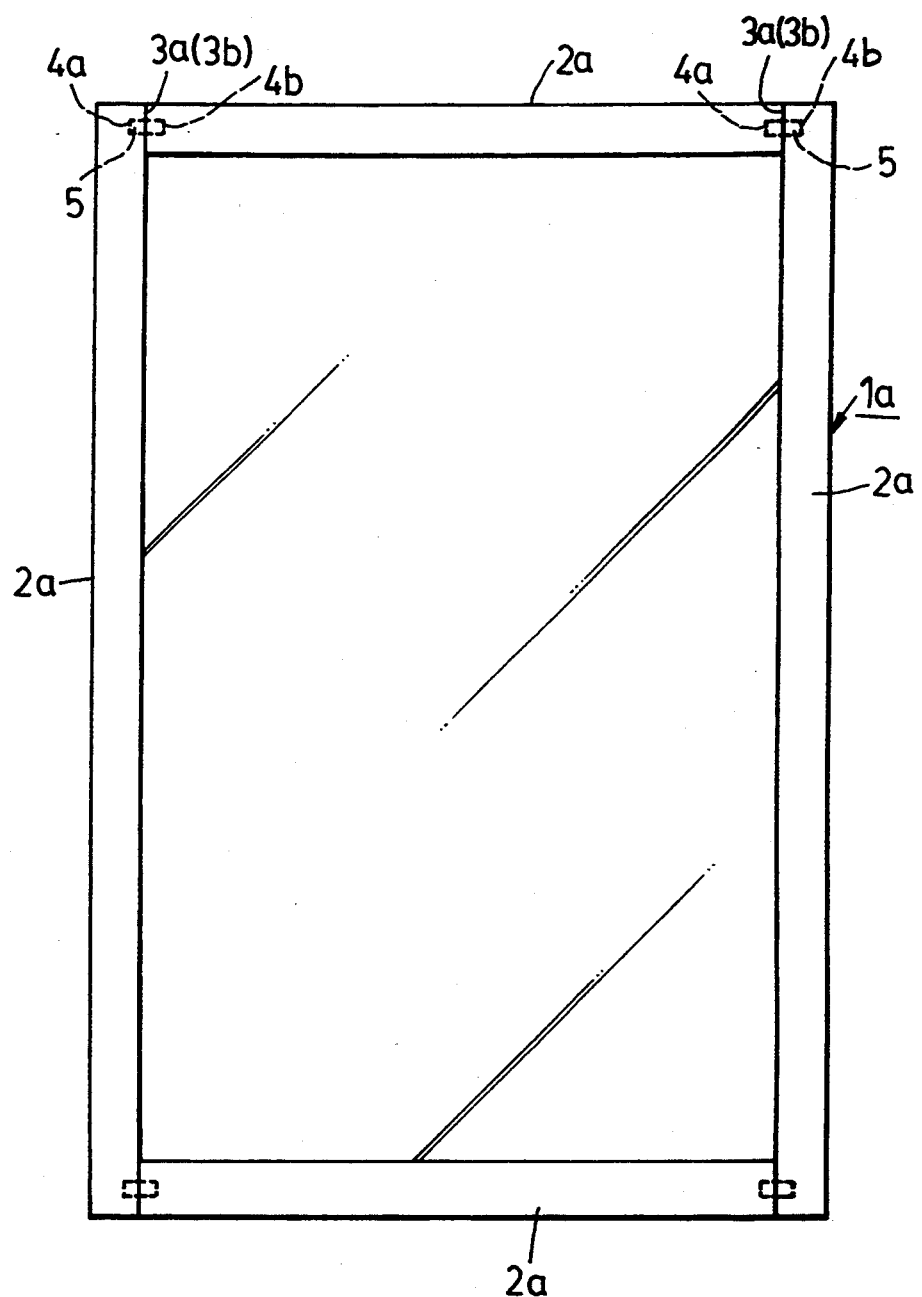
FIG. 2 is a schematic view of a second example of a conventional rectangular wooden frame.

Before the present invention is described in greater detail, it should be noted that like elements are indicated by the same reference numerals throughout the disclosure.

Figure 3:
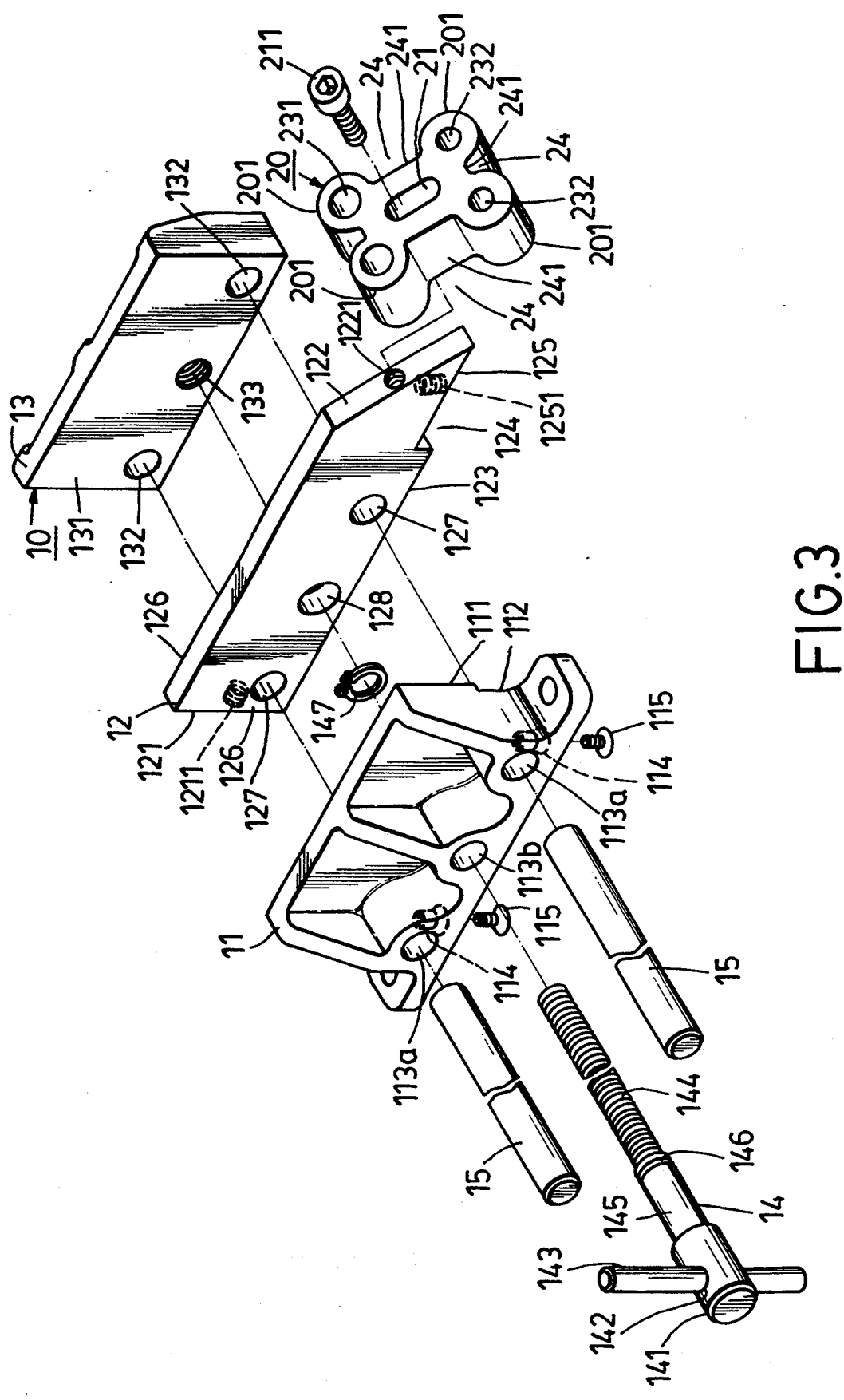
FIG. 3 is an exploded perspective view of the first preferred embodiment of a drill guiding device according to the present invention.
Figure 4:
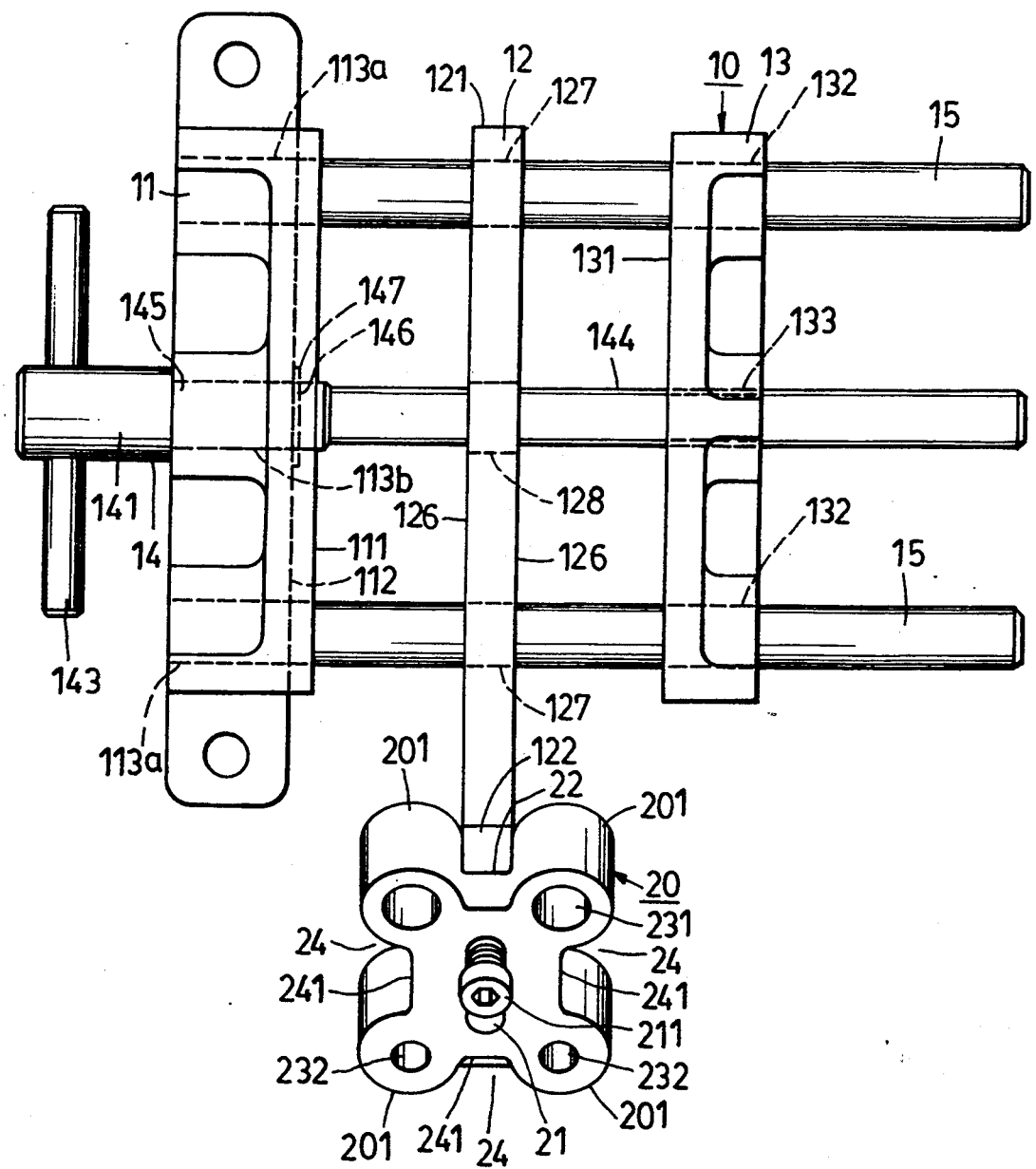
FIG. 4 is a top view of the first preferred embodiment to illustrate its assembly.

Referring to FIGS. 3 and 4, the first preferred embodiment of a drill guiding device according to the present invention is shown to comprise a clamping assembly 10 and a guide block 20.

The clamping assembly 10 is shown to include a stationary clamping block 11, a mounting block 12, a movable clamping block 13, a threaded shaft 14, and an elongated guide means in the form of a pair of parallel guide shafts 15.

The stationary clamping block 11 has a smooth end face 111 and a lower portion that is formed with a longitudinally extending recess 112 in the end face 111. The lower portion of the stationary clamping block 11 is further formed with a spaced pair of horizontally aligned first guide holes (113a) and a first shaft hole (113b) disposed between and aligned horizontally with the first guide holes (113a). The first guide holes (113a) and the first shaft hole (113b) extend through the recess 112 and are equal in diameter. The stationary clamping block 11 further has a bottom surface formed with a pair of threaded mounting holes 114. Each of the threaded holes 114 is communicated with a corresponding one of the first guide holes (113a) and is transverse to an axis of the corresponding one of the first guide holes (113a).

In this embodiment, the guide shafts 15 are cylindrical shafts and extend horizontally from the stationary clamping block 11. Each of the guide shafts 15 has a first end portion which extends into a respective one of the first guide holes (113a) in the stationary clamping block 11, and an opposite second end portion. A pair of positioning screws 115 engage the threaded mounting holes 114 of the stationary clamping block 11 to mount removably the first end portions of the guide shafts 15 thereon.

The threaded shaft 14 has a head portion 141 which is formed with a radially extending through-hole 142 and a threaded shank portion 144 which is connected axially to the head portion 141 by means of an intermediate axial stub 145. A lever 143 extends fittingly through the through-hole 142 to facilitate manual rotation of the threaded shaft 14. The axial stub 145 is formed with an annular peripheral groove 146 adjacent to the threaded shank portion 144. During assembly, the threaded shaft 14 extends through the stationary clamping block 11 such that the axial stub 145 is disposed rotatably in the first shaft hole (113b). The groove 146 is disposed on one end of the first shaft hole (113b), and a C-shaped fastening ring 147 engages the axial stub 145 in the groove 146, thus mounting rotatably the threaded shaft 14 on the stationary clamping block 11.

The mounting block 12 is mounted slidably on the guide shafts 15 and has an upright edge 121, an inclined edge 122 opposite to the upright edge 121, and a bottom edge 123 extending between the upright edge 121 and the inclined edge 122. The upright edge 121 is preferably perpendicular to the bottom edge 123. The bottom edge 123 is formed with a notch 124 adjacent to the inclined edge 122. The notch 124 has a connecting face 125 which forms a 45° angle with respect to the inclined edge 122. Each of the upright edge 121, the inclined edge 122, and the connecting face 125 has a central portion which is formed with a respective screw hole 1211, 1221, 1251. The mounting block 12 has opposite side surfaces 126 formed with a pair of horizontally aligned second guide holes 127 and a second shaft hole 128 disposed between the second guide holes 127. The second guide holes 127 are aligned and are equal in diameter with the first guide holes (113a) of the stationary clamping block 11, thus permitting the guide shafts 15 to extend slidably therethrough. The second shaft hole 128 is aligned with the first shaft hole (113b) but has a diameter wider than that of the threaded shaft 14.

The movable clamping block 13 corresponds with the stationary clamping block 11 in construction and is mounted slidably on the second end portions of the guide shafts 15. The movable clamping block 13 has a smooth end face 131 that faces the end face 111 of the stationary clamping block 11, and is formed with a pair of horizontally aligned third guide holes 132 and a threaded hole 133 disposed between the third guide holes 132. The third guide holes 132 are aligned and are equal in diameter with the first guide holes (113a) of the stationary clamping block 11, thus permitting the guide shafts 15 to extend slidably therethrough. The threaded hole 133 is aligned with the first shaft hole (113b) and engages threadedly the threaded shank portion 144 of the threaded shaft 14.

In this embodiment, the guide block 20 is generally rectangular in shape and has an intermediate portion that is formed with a longitudinally extending slot 21. The guide block 20 further has a rear surface which is formed with a longitudinally extending slit 22 which is aligned and communicated with the slot 21. The slit 22 should be slightly wider than the thickness of the mounting block 12. Therefore, the guide block 20 can be mounted selectively on one of the edges 121, 122, 125 of the mounting block 12. A screw fastener 211 extends through the slot 21 to engage threadedly the screw hole 1211, 1221, 1251 in the selected one of the edges 121, 122, 125, thereby mounting adjustably the guide block 20 on the latter. The guide block 20 has four rounded corners 201 formed with a respective guide hole 231, 232. The diameters of the guide holes 231, 232 correspond with the size of the hole which is to be formed in the workpiece. In this embodiment, the guide holes 231 at upper ones of the corners 201 have a first diameter which is larger than a second diameter of the guide holes 232 at lower ones of the corners 201. An indentation 24 is formed between adjacent guide holes 231, 232. The indentations 24 have an innermost end 241 which is aligned with the centers of the adjacent guide holes 231, 232. The innermost ends 241 of the indentations 24 serve to indicate the positions of the guide holes 231, 232 relative to the workpiece so as to avoid the drilling of relatively large holes in relatively thin workpieces in order to prevent damage to the latter.

Figure 5:
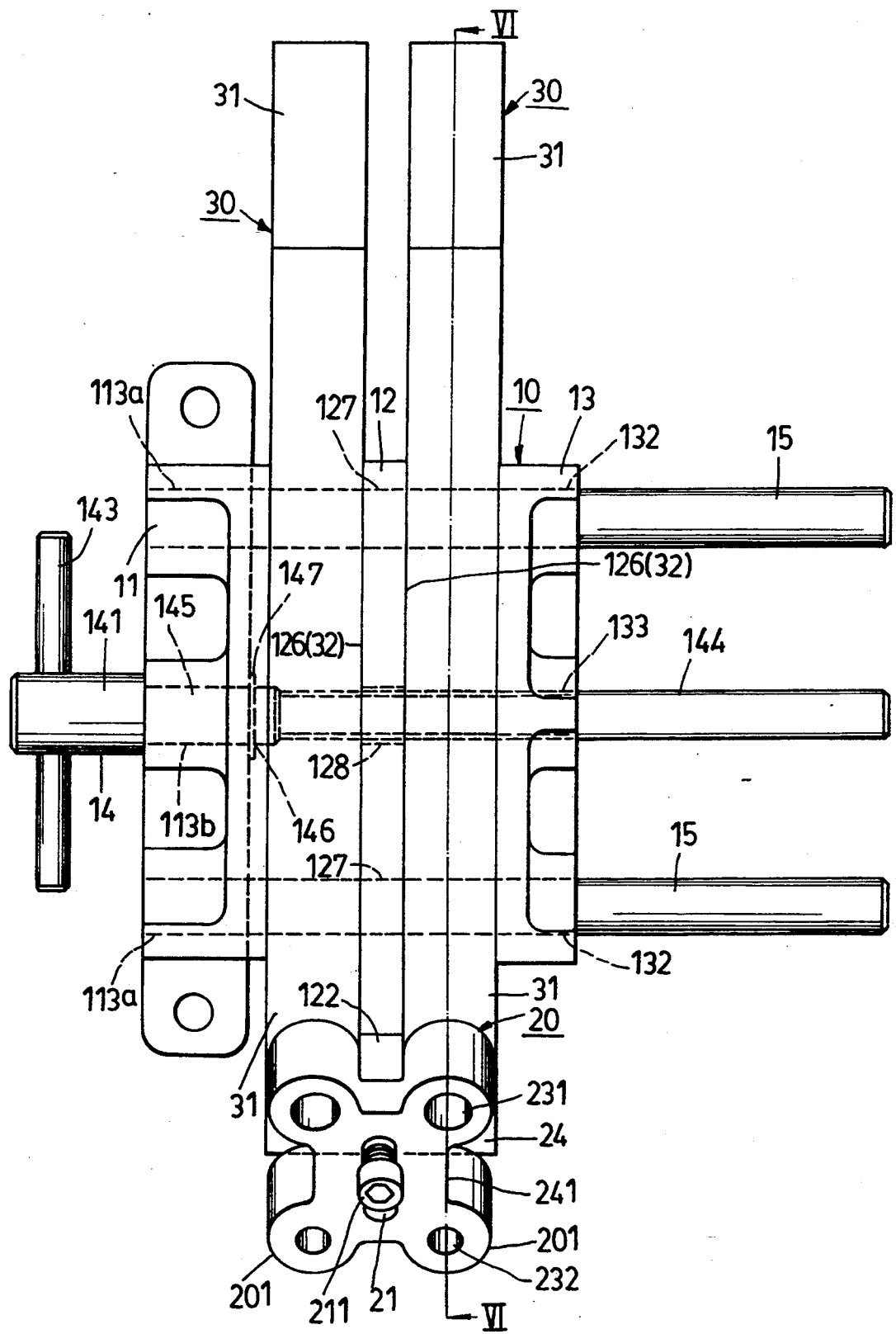
FIG. 5 is a top view showing a preferred use of the first embodiment.
Figure 6:
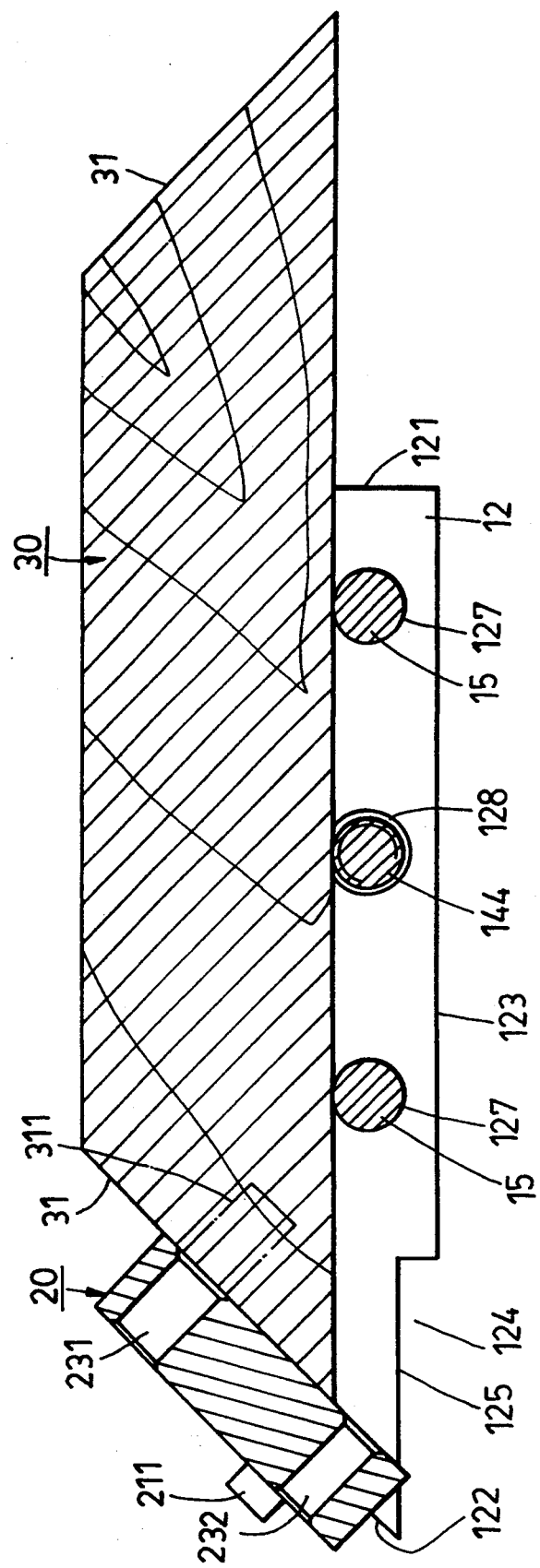
FIG. 6 is a sectional view of the first embodiment taken along line VI—VI in FIG. 5.

Referring to FIGS. 5 and 6, the guide block 20 is secured on the inclined edge 122 of the mounting block 12 when it is desired to form a mounting hole 311 on each of a pair of workpieces 30 which have opposite working surfaces 31 that incline by an angle of 45°. One of the workpieces 30 is provided between the stationary clamping block 11 and the mounting block 12, while the other one of the workpieces 30 is provided between the mounting block 12 and the movable clamping block 13. The lever 14.3 is then operated so as to rotate the threaded shaft 14 in a first direction, thereby causing the movable clamping block 13 to move toward the mounting block 12 in order to clamp the workpieces 30 on the clamping assembly 10. At this time, each of the workpieces 30 has a side surface 32 which abuts tightly one of the side surfaces 126 of the mounting block 12. Furthermore, one of the working surfaces 31 of each of the workpieces 30 also abuts tightly the rear surface of the guide block 20. The position of the guide block 20 is then adjusted so as to align selected ones of the guide holes 231, 232 with intended locations of the mounting holes 311 to be formed in the workpieces 30.

After the workpieces 30 have been secured to the clamping assembly, a drill can be extended into the selected ones of the guide holes 231, 232 to form the mounting holes 311 in the working surfaces 31 of the workpieces 30. The lever 143 is then operated so as to rotate the threaded shaft 14 in a second direction, thereby causing the movable clamping block 13 to move away from the mounting block 12 in order to permit removal of the workpieces 30 from the clamping assembly 10. The workpieces 30 are replaced on the clamping assembly 10 such that the other one of the working surfaces 31 of each of the workpieces 30 abuts the rear surface of the guide block 20. The above procedure is then repeated in order to secure the workpieces 30 on the clamping assembly 10 before drilling of the mounting holes 311 in the other one of the working surfaces 31 of each of the workpieces 30 can be commenced.

It is noted that precise formation of holes can be ensured when the present invention is in use. Thus, the quality of rectangular wooden frames which consist of frame members that are machined with the aid of the present invention can be maintained.

Figure 7:
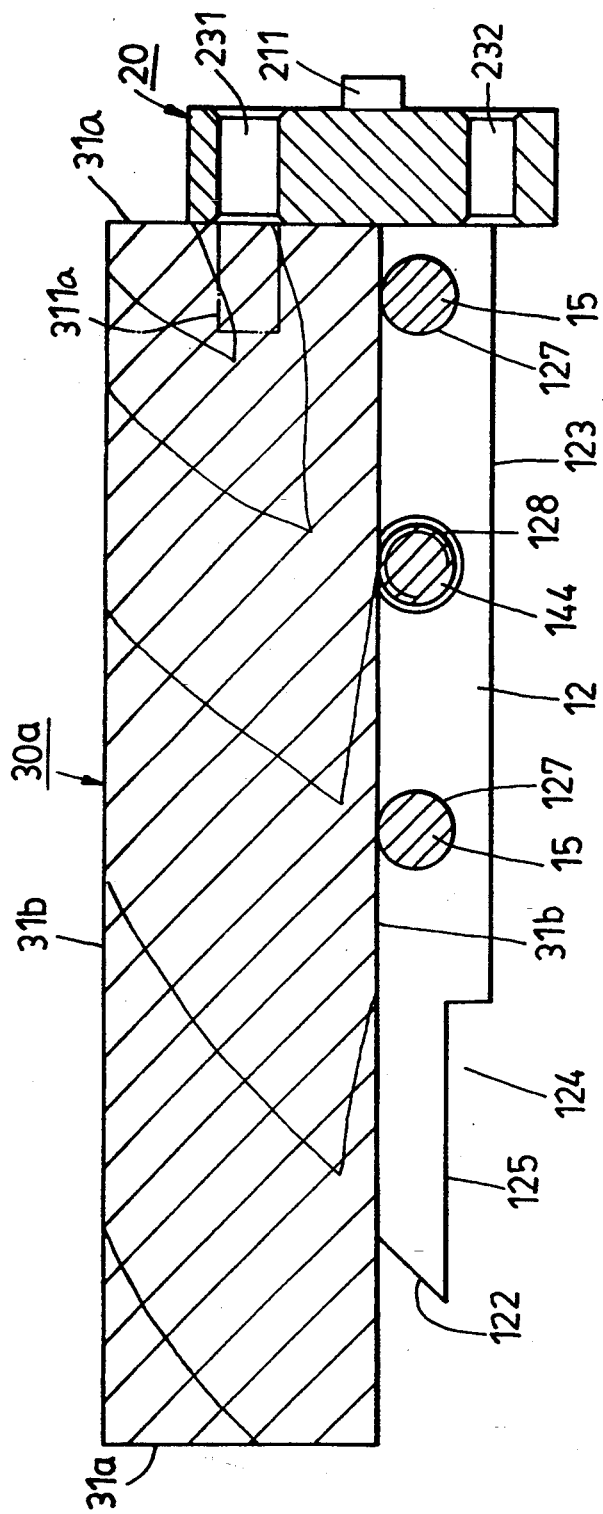
FIG. 7 is a sectional view showing another preferred use of the first embodiment according to the present invention.

Referring to FIG. 7, the guide block 20 is secured on the upright edge 121 of the mounting block 12 when it is desired to form a mounting hole (311a) on one of two end surfaces (31a) of a pair of workpieces (30a). As with the previously described procedure, one of the workpieces (30a) is clamped tightly between the stationary clamping block 11 and the mounting block 12, while the other one of the workpieces (30a) is clamped tightly between the mounting block 12 and the movable clamping block 13. At this stage, one of the end surfaces (31a) of each of the workpieces (30a) abuts the rear surface of the guide block 20. Drilling of the mounting hole (311a) on one of the end surfaces (31a) of each of the workpieces (30a) can be commenced at this time.

Figure 8:
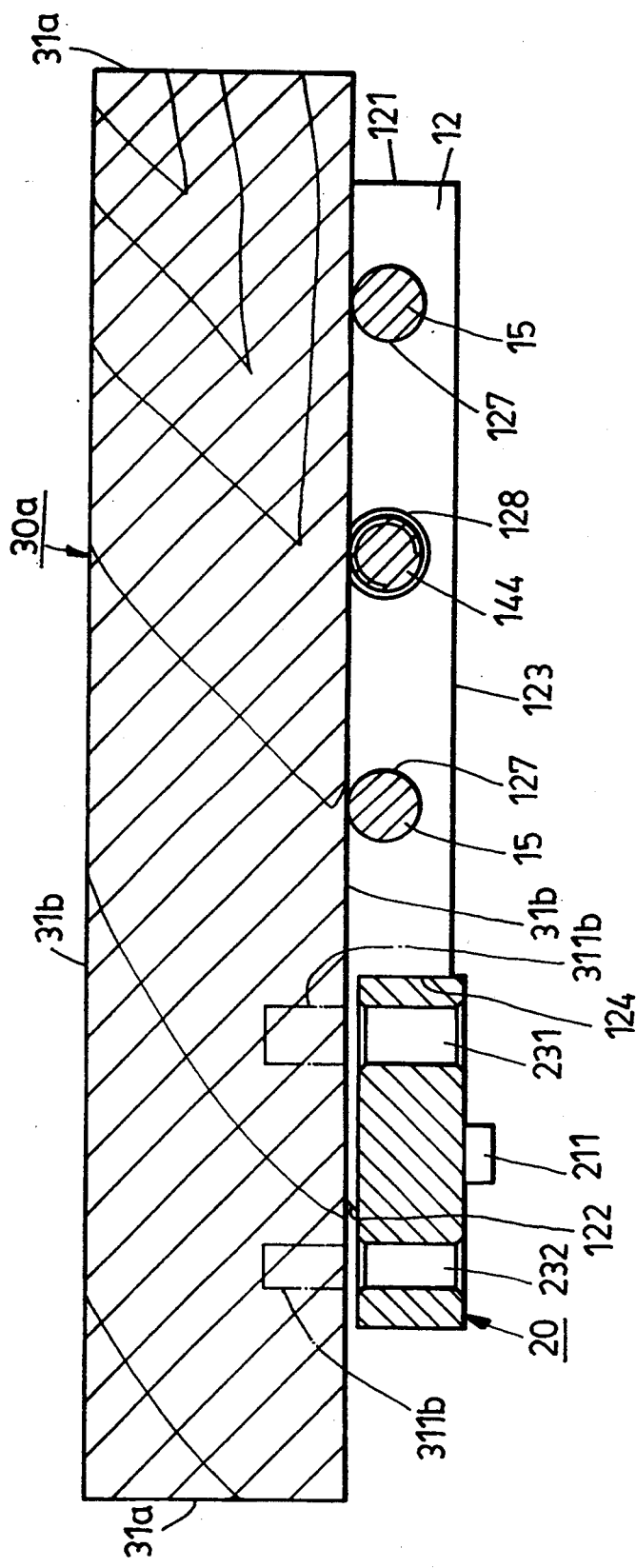
FIG. 8 is a sectional view showing still another preferred use of the first embodiment according to the present invention.

Referring to FIG. 8, the guide block 20 is secured to the connecting face 125 in the notch 124 at the bottom edge 123 of the mounting block 12 when it is desired to form a mounting hole (311b) on one of the side surfaces (31b) of the workpieces (30a). As with the previously described procedures, the workpieces (30a) are secured on the clamping assembly 10 such that selected ones of the guide holes 231, 232 in the guide block 20 are aligned with the intended locations of the mounting holes (311b) to be formed in the workpieces (30a). Drilling of the mounting holes (311b) can be commenced at this time.

Figure 9:
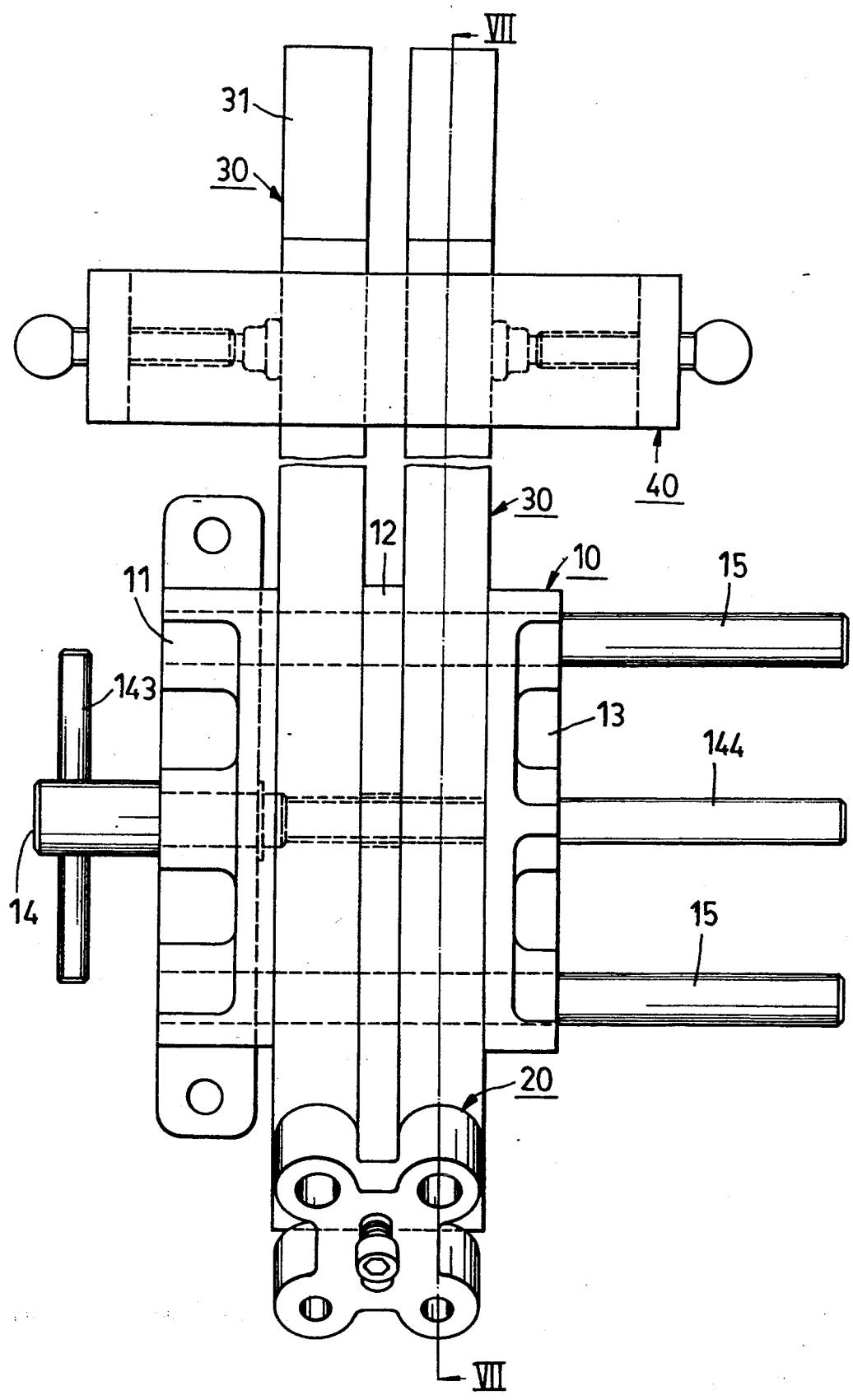
FIG. 9 is a top view of the second preferred embodiment of a drill guiding device according to the present invention when in use.
Figure 10:
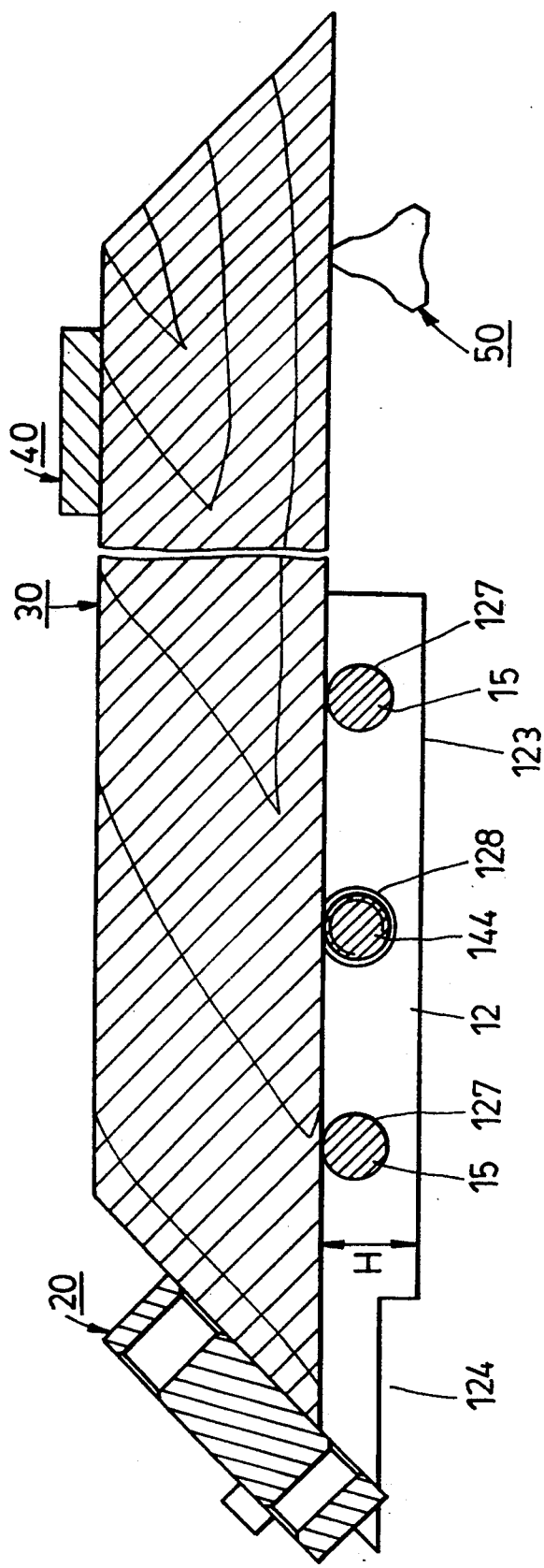
FIG. 10 is a sectional view of the second preferred embodiment taken along line X—X in FIG. 9.

Referring to FIGS. 9 and 10, the second preferred embodiment of a drill guiding device according to the present invention is shown to further comprise a positioning unit 40 and a rear support unit 50. When relatively long workpieces 30 are to be machined, the positioning unit 40 serves to clamp the rear ends of the workpieces 30, while the rear support unit 50 serves to support the rear ends of the workpieces 30 on a flat surface. The rear support unit 50 is generally triangular in cross-section and has a height which is equal to the distance (H) of a highest point on the guide shafts 15 from the bottom edge 123 of the mounting block 12. The positioning unit 40 and the rear support unit 50 serve to enhance the stability of the workpieces 30 during machining.

Figure 11:
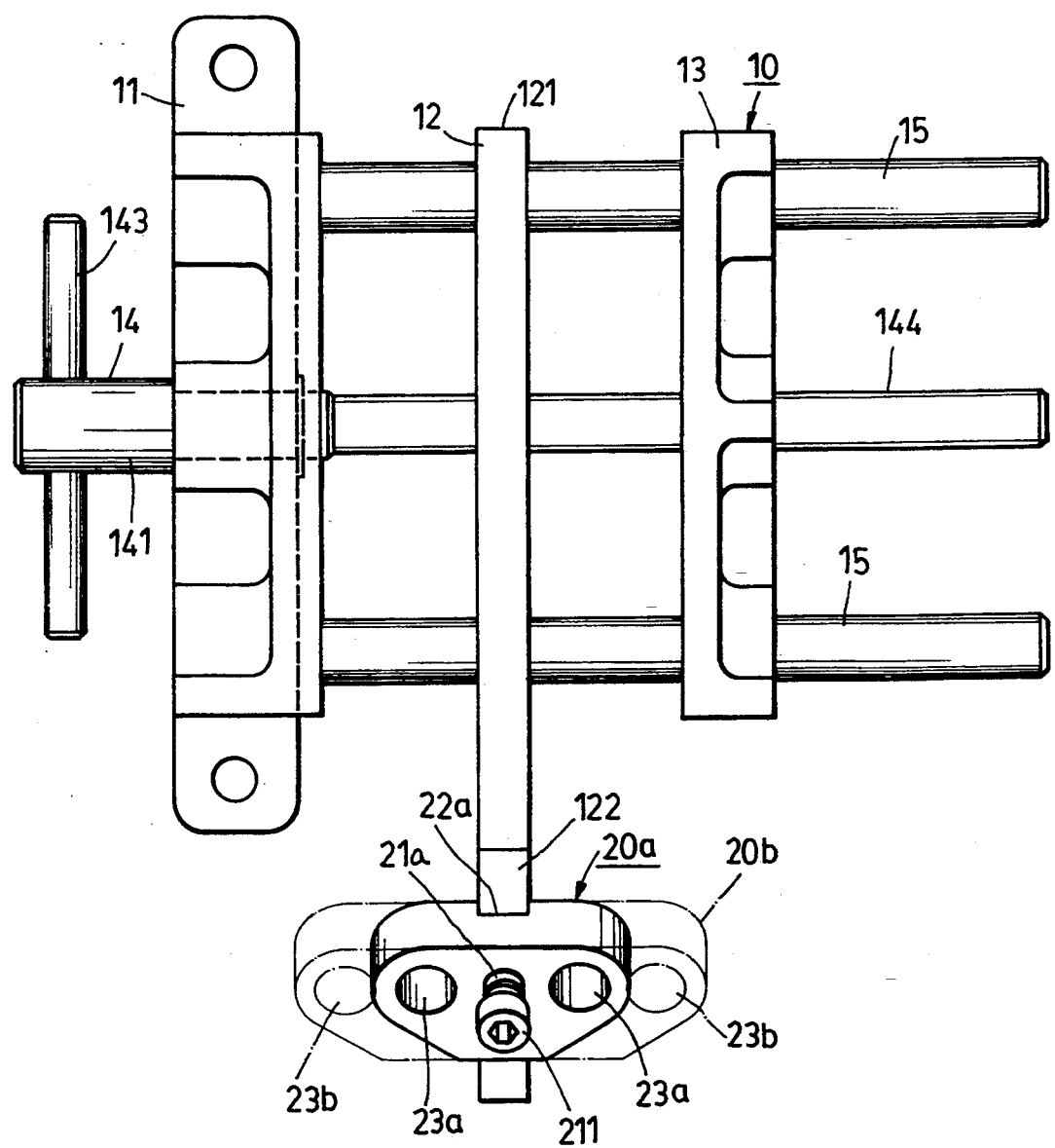
FIG. 11 is a top view of the third preferred embodiment of a drill guiding device according to the present invention.

Referring to FIG. 11, the third preferred embodiment of a drill guiding device according to the present invention is shown to be substantially similar to the first preferred embodiment. However, unlike the first preferred embodiment, the guide block (20a) of the third preferred embodiment is generally triangular in shape. The guide block (20a) has an intermediate portion that is similarly formed with a longitudinally extending slot (21a). The guide block (20a) further has a rear surface which is formed with a longitudinally extending slit (22a) which is aligned and communicated with the slot (21a), thereby permitting the extension of a screw fastener 211 in order to engage threadedly the screw hole 1211, 1221, 1251 in a selected one of the edges 121, 122, 125 of the mounting block 12. The guide block (20a) is formed with a guide hole (23a) on two sides of the slot (21a). To permit machining of four workpieces at one time, the guide block (20a) may be further formed with a pair of second guide holes (23b) which are spaced equally from the respective first guide hole (23a). The number of guide holes may thus correspond with the number of workpieces to be machined.

Although the workpieces used in explaining the operation of the drill guiding device of the present invention are elongated frame members of a rectangular wooden frame, other types of workpieces may be machined with the aid of the present invention, such as cabinets, chairs and the like. Note that the drill guiding device may include different sizes of guide blocks to permit machining of different dimensions of workpieces. Furthermore, since the guide block is provided with a slot, the position of the guide block relative to the workpiece may be adjusted easily in order to correspond with the intended locations of the holes that are to be formed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A drill guiding device for guiding axial movement of a drill when forming a hole in a workpiece, comprising:

a clamping assembly including: a stationary clamping block; an elongated guide means extending horizontally from said stationary clamping block, said guide means having a first end portion mounted removably on said stationary clamping block and a second end portion; a threaded shaft having a head portion which is mounted rotatably to said stationary clamping block, and a threaded shank portion which extends axially from said head portion, said threaded shaft being parallel to said guide means; a movable clamping block mounted slidably on said second end portion of said guide means and provided with a threaded hole to engage threadedly said threaded shank portion of said threaded shaft; and a mounting block mounted slidably on said guide means and disposed between and parallel to said stationary and movable clamping blocks, said mounting block having an upright edge, an inclined edge opposite to said upright edge, and a bottom edge extending between said upright and inclined edges, said upright edge being substantially perpendicular to said bottom edge, said inclined edge forming an angle of about 45° with respect to said bottom edge, each of said upright edge, said inclined edge, and said bottom edge being formed with a respective screw hole;

a guide block having an intermediate portion formed with a longitudinally extending slot of predetermined length and at least one guide hole on each side of said slot, each of said guide holes permitting extension of the drill thereinto; and a screw fastener extending through said slot of said guide block and engaging threadedly said screw hole in a selected one of said upright edge, said inclined edge, and said bottom edge of said mounting block;

whereby, said mounting block and one of said stationary and movable clamping blocks clamp opposite sides of the workpiece, and said guide block is positioned adjacent to a working surface of the workpiece such that one of said guide holes of said guide block is aligned with an intended location of the hole to be formed in the workpiece.

2. The drill guiding device as claimed in claim 1, wherein:

said guide means includes a pair of guide shafts;

said stationary clamping block has a lower portion that is formed with a pair of horizontally aligned first guide holes and a first shaft hole disposed between and aligned horizontally with said first guide holes, each of said guide shafts having a first end portion extending into a respective one of said first guide holes and being mounted removably on said stationary clamping block, said head portion of said threaded shaft extending rotatably through said first shaft hole; and said mounting block is formed with a pair of horizontally aligned second guide holes that permit said guide shafts to extend slidably therethrough, and a second shaft hole disposed between said second guide holes to permit extension of said threaded shaft therethrough, said second shaft hole having a diameter larger than that of said threaded shaft.

3. The drill guiding device as claimed in claim 2, wherein said stationary clamping block is formed with a pair of threaded mounting holes, each of which being communicated with a corresponding one of said first guide holes and being transverse to an axis of said corresponding one of said first guide holes, said drill guiding device further comprising a pair of screws which engage said threaded mounting holes of said stationary clamping block to mount removably said first end portions of said guide shafts on said stationary clamping block.

4. The drill guiding device as claimed in claim 1, wherein said bottom edge of said mounting block is formed with a notch adjacent to said inclined edge, said notch having a connecting face which forms an angle of about 45° with respect to said inclined edge, said screw hole of said bottom edge being formed in said connecting face.

5. The drill guiding device as claimed in claim 1, wherein said guide block has a rear surface which is formed with a longitudinally extending slit that is aligned and communicated with said slot, said slit being slightly Wider than a thickness of said mounting block to permit extension of the selected one of said upright edge, said inclined edge and said bottom edge of said mounting block thereinto.

6. The drill guiding device as claimed in claim 1, wherein said guide block is generally rectangular in shape and has four rounded corners formed with a respective said guide hole, said guide holes at upper ones of said corners having a first diameter, said guide holes at lower ones of said corners having a second diameter different from said first diameter.

* * * * *